United States Patent [19]

Tannenbaum

[11] Patent Number: 5,478,651
[45] Date of Patent: Dec. 26, 1995

[54] PROCESS FOR MAKING FLUOROPOLYMER FINISH COMPOSITION

[75] Inventor: Harvey P. Tannenbaum, Wynnewood, Pa.

[73] Assignee: E. I. Du Pont de Nemours and Company, Wilmington, Del.

[21] Appl. No.: 331,839

[22] Filed: Oct. 31, 1994

[51] Int. Cl.$^6$ ....................................... B32B 27/00
[52] U.S. Cl. .................. 428/422; 427/388.4; 427/388.5; 427/409; 428/463
[58] Field of Search ................ 427/388.2, 388.4, 427/388.5; 428/422, 463

[56] References Cited

U.S. PATENT DOCUMENTS

| | | | |
|---|---|---|---|
| 4,087,394 | 5/1978 | Concannon | 260/29.6 F |
| 4,118,537 | 10/1978 | Vary et al. | 427/409 X |
| 4,139,576 | 2/1979 | Yoshimura et al. | 260/857 PA |
| 4,910,086 | 3/1990 | Kawakami et al. | 428/419 |
| 5,168,013 | 12/1992 | Tannebaum | 428/422 |

FOREIGN PATENT DOCUMENTS 1358428 11/1971 United Kingdom.

*Primary Examiner*—Michael Lusignan
*Attorney, Agent, or Firm*—Edwin Tocker

[57] ABSTRACT

In the formation of a fluoropolymer non-stick layer on a substrate such as of cookware and bakeware, improved adhesion of the layer is obtained by co-grinding at least the polymer binder component with the pigment component. In an aqueous system, this co-grinding is carried out in water which contains a surfactant and the polymer binder is soluble in the water or water organic solvent mixture the resultant co-ground aqueous dispersion/solution is blended with aqueous dispersion of fluoropolymer to form the coating composition. Addition of inorganic filler film hardener to the co-grinding step also improves the scratch resistance of the of the non-stick layer.

15 Claims, No Drawings

5,478,651

PROCESS FOR MAKING FLUOROPOLYMER FINISH COMPOSITION

FIELD OF THE INVENTION

This invention relates to a process for making fluoropolymer finish compositions, especially applicable to the aqueous dispersion form of such compositions.

BACKGROUND OF THE INVENTION

Fluoropolymer finish compositions are used to form non-stick surfaces on a wide variety, of substrates, such as metals, e.g. aluminum, cold-rolled steel, stainless steel, and ceramics, such as glass, enamel, and pyroceram, for a wide variety of products, e.g. cookware, bakeware, iron soleplates, waffle irons, ice-cube trays, snow shovels and plows, chutes and conveyors, saws, hoppers and other industrial containers. The finish formed on these materials for these as well as other products may be a single layer of fused composition or multiple layers of composition, in which the layer in direct contact with the substrate is called the primer layer for the overcoat fluoropolymer-containing layer(s). In all of these applications it is necessary for the layer in contact with the substrate to adhere to it, so that the non-stick finish provides this attribute in the particular service of the coated product.

Fluoropolymer finish compositions have preferably been prepared in the form of an aqueous dispersion of the fluoropolymer, and the aqueous dispersion has then been used to coat the substrate, followed by drying and baking to fuse the coating to form the layer adhered to the substrate. In addition to fluoropolymer, the dispersion has contained polymer binder in solution in the dispersion medium and pigment dispersed in the dispersion. In some cases, the dispersion also has inorganic film hardener dispersed therein, which provided durability, e.g. scratch resistance, to the non-stick coating.

It has been the practice in making these compositions to (a) obtain the fluoropolymer aqueous dispersion from the fluoropolymer manufacturer, (b) form the solution of polymer binder in water, which may also include organic solvent for the binder, which solvent is miscible with water, and (c) mill pigment in water which contains a surfactant, to form a mill base, and then blending the dispersion of (a), the solution of (b), and the mill base of (c) together to form the coating composition. This was the blending by techniques normal in the art referredto in U.S. Pat. No. 5,168,013 (Tannenbaum). When filler film hardener was used, this was simply added to the dispersion (a). U.S. Pat. No. 4,139,576 (Yoshimura et. al.) in Examples 1 and 5 discloses the separate milling of polymer binder and pigment and then blending these milled products with polytetrafluoroethylene. U.S. Pat. No. 4,087,394 (Concannon) discloses the mixing together of an aqueous dispersion of TFE/HFP copolymer, a black mill base, and an aqueous solution of binder (polyamide acid salt, also referred to as polyamic acid salt) in Example 1.

There remains file need to improve the durability of the fluoropolymer finish to its; substrate, especially with regard to adhesion of the finish to the substrate.

SUMMARY OF THE INVENTION

The present invention involves the discovery of a process for preparing fluoropolymer aqueous dispersion finish composition which improves adhesion of the ultimate non-stick coating to its substrate. More specifically, the present invention involves the process comprising (i) intimately mixing of aqueous dispersion of pigment with aqueous solution of polymer binder by co-grinding said dispersion and solution together and (ii) mixing the resultant co-ground dispersion/solution and aqueous dispersion of fluoropolymer with one another to form a finish coating composition.

The present invention also contemplates the process of forming a non-stick finish on a substrate, comprising applying the aforesaid finish coating composition to the substrate and baking the composition to form an adherent fluoropolymer containing layer on said substrate.

The present invention further contemplates the intimate mixing of polymer binder dissolved in organic solvent, pigment, and fluoropolymer in particulate form by co-grinding these ingredients together in said organic solvent, especially wherein the fluoropolymer is polytetrafluoroethylene micropowder, and the resultant organic solvent medium is especially useful for coil coating, i.e., coating of metal strip which is subsequently stamped into bakeware shapes. Such coating would usually by overcoated with a fluoropolymer-containing composition to form the release layer, with the first-mentioned layer serving as the primer therefor, and of course both layers would be baked onto the substrate to form the non-stick finish.

DETAILED DESCRIPTION

Aqueous dispersions of fluoropolymer are commercially available from fluoropolymer manufacturers. The fluoropolymer is present in the dispersion in very small particle size, e.g. about 0.2 micrometer and, and the particles remain dispersed via a surfactant being present in the dispersion without causing coagulation. The stability of the dispersion is such that it can be stirred for the purpose of blending other ingredients into the dispersion. Examples of fluoropolymers include polytetrafluoroethylene (PTFE), which is not melt fabricable, and copolymers of tetrafluoroethylene (TFE) with at least on other monomer in a sufficient amount that makes the resultant copolymer melt-fabricable. Examples of PTFE include the homopolymer and modified PTFE, which contains a small amount of co monomer such as hexafluoropropylene (HFP) or perfluoro(alkyl vinyl) ether (PAVE), wherein the alkyl group contains from 1 to 5 carbon atoms. Examples of melt fabricable fluoropolymers include copolymers of TFE with one or more of perfluoroolefins, such as 1tFP, and PAVE, such as the copolymer of tetrafluoroethylene with perfluoro(propyl vinyl) ether (PFA). The fluoropolymer component: of the finish composition can consist of a single fluoropolymer or a mixture thereof in the aqueous dispersion. The mixture can be made by blending aqueous dispersions of individual fluoropolymers.

The PTFE described above will usually have a melt viscosity of at least $1 \times 10^9$ Pa.s. A lower melt viscosity PTFE is available, called PTFE micropowder, having a melt viscosity of $1 \times 10^2$ to $1 \times 10^7$ Pa.s, can also be used in the present invention. it can be obtained by aqueous dispersion polymerization, in which case it is in a form which is convenient for use in the aqueous dispersion embodiment of the present invention. Another method of obtaining the micropowder is irradiation of the higher melt viscosity PTFE. This micropowder is in convenient form for use in the organic solvent embodiment of the present invention. The solvent chosen may depend on the binder component used, so as preferably to be able to dissolve it.

The binder component is composed of polymer which is film-forming upon heating to fusion and is also thermally stable. This component is well known in primer applications for non-stick finishes, for adhering the fluoropolymer-containing primer layer to substrates and for film-forming within and as part of the primer layer. The fluoropolymer by itself has little to no adhesion to a smooth substrate. The binder is generally non-fluorine containing and yet adheres to the fluoropolymer. Preferred binders are those that are soluble in water or a mixture of water and organic solvent for the binder, which solvent is miscible with water. This solubility aids in the blending of the binder with the fluorocarbon component in the aqueous dispersion form.

Examples of the binder component is polyamic acid salt which converts to polyamideimide upon baking of the composition to form the primer layer. This binder is preferred because in the fully imidized form obtained by baking the polyamic acid salt, this binder has a continuous service temperature in excess of 250° C. The polyamic acid salt is generally available as polyamic acid having an inherent viscosity of at least 0.1 as measured as a 0.5 wt% solution in N.N-dimethylacetamide at 30° C. It is dissolved in a coalescing agent such as N-methylpyrolidone, and a viscosity-reducing agent, such as furfuryl alcohol and reacted with tertiary amine, preferably triethylamine, to form the salt, which is soluble in water, as described in greater detail in U.S. Pat. No. 4,014,834 (Concannon).

Another example of the binder component is polyethersulfone, which can have sparing water solubility but which can be dissolved in an organic solvent such as N-methylpyrrolidone which is miscible with water, with the resultant solution being uniformly blendable with the fluoropolymer aqueous dispersion. Polyethersulfones are amorphous thermoplastic polymers with a glass transistion temperature of about 230° C. and a sustained service temperature of about 170° C. to 190° C.

In the embodiment of the present invention using an organic solvent, the polymer binder need not be soluble in water but is preferably soluble in the organic solvent. For polyamic acid, and polyethersulfone, the solvent N-methylpyrrolidone is among the solvents that can be used. Other polymer binders such as polyethercretherketone and polyphenylene sulfide may used as dispersed particle in the organic solvent.

For simplicity, only one binder need be used to form the binder component of the composition of the present invention.

The proportion of fluoropolymer and binder in compositions of the present invention is preferably in the weight ratio of 0.8 to 1.5:1. The weight ratios of fluoropolymer to binder disclosed herein are based on the weight of these components in the primer layer formed by baking the composition after application to its substrate. The baking drives off the volatile materials present in the coating composition, including the salt moiety of the polyamic acid salt as the imide bond are formed during baking. For convenience, the weight of binder, when it is polyamic acid salt which is convened to polyamideimide by the baking step, can be taken as the weight of polyamic acid in the starting composition, whereby the weight ratio of fluoropolymer to binder can be determined from the amount of fluoropolymer and binder in the starting composition. When the composition of the invention is in the preferred aqueous dispersion form, these components will will constitute about 5 to 50 wt% of the total dispersion.

In accordance with the aqueous dispersion embodiment of the present invention, the solution of binder and the water medium containing the pigment and surfactant are added one to the other, either prior to the milling of the pigment or during the pigment milling operation. In any event, the co-grinding of the binder solution with the pigment reduces the particle size of the pigment, whether by deagglomeration of pigment particles or size reduction of deagglomerated particles, while achieving an intimate mixture with the binder in solution by virtue of the grinding action in the presence of the dissolved polymer binder. The milling (co-grinding) after addition of the binder solution is effective with respect to the particular milling equipment used and the time of co-grinding, to obtain an appreciable improvement at least in adhesion to the substrate of the baked layer ultimately obtained from the co-ground dispersion. In the case of PES binder, wherein this material is only sparingly soluble, whereby a portion of the binder may be present as particles, the binder is also co-ground with the pigment. Thus, the expression "co-grinding" as used herein is used to mean milling of the pigment in the presence of binder, which may be entirely or partially dissolved and wherein the particle size of the pigment is reduced.

If inorganic filler film hardener is desired for particular compositions to make the layer harder, i.e. more durable by virtue of improved scratch resistance, then the film hardener is also added to the pigment milling operation. Since the film hardener is water insoluble, it will be co-ground, i.e. particles reduced in size along with the pigment. The filler nature of the film hardener means that it has a particle size usually within the range of one to 100 micrometers, but in the course of co-grinding the particle size will generally be reduced to less than 20 micrometers and usually within the range of 2 to 10 micrometers. As in the case of the pigment, the main purpose of co-grinding of the film hardener with the binder is to achieve an intimate mixture with the binder as in the case of the pigment. Examples of film hardener include the silicate compounds, such as metal silicate, e.g. aluminum silicate, and metal oxides, such as titanium dioxide and aluminum oxide. When titanium dioxide is used as the film hardener, the amount used is generally several time greater than would be used for coloring the layer formed from the composition.

Co-grinding of the film hardener with the polymer binder solution unexpectedly improves the durability of the layer or non-stick coating containing it, as compared with the same layer composition prepared by separate grinding of these components.

The co-ground aqueous dispersion of pigment, binder, and film hardener, if any, is then blended with the aqueous dispersion of fluoropolymer in the proportions desired to produce the aqueous dispersion finish composition desired. The apparatus used for the milling operation and subsequent blending with the aqueous dispersion of fluoropolymer can be conventional. The mixing action used to blend the dispersions together is short of causing the fluoropolymer dispersion to coagulate. Under this condition, the finish composition is obtained in aqueous dispersion form.

The solids concentration of the finish dispersion can vary widely but will generally be from 10 to 75 wt%. The proportion of fluoropolymer to binder can also vary widely, e.g., from 0.5 to 8:1, although a preferred weight ratio is 0.5 to 2.0:1. The proportion of pigment will depend on the particular pigment and intensity of color desired. If film hardener is present, its proportion will be that which is effective to increase the durability of the layer formed from the composition. Generally, more than 5 wt% will be required, based on the weight of the composition after baking (all volatiles such as water, solvent, surfactant, viscosity control and leveling agent, are driven off), and more than 10 wt% is preferred. Generally no more than 30 wt% can be accommodated by the layer formed from the finish composition, before other properties deteriorate.

The aqueous finish dispersion of the present invention can be applied to the substrates to make products such as have been made with non-stick finishes prior to the present invention, such as mentioned hereinbefore. The application can be by conventional technique and equipment, such as spraying or roller coating depending on the particular product (substrate) involved and its shape. The application can produce a one-coat non-stick finish or the primer layer of a multiple layer finish, in which the primer layer is overcoated with one or more additional fluoropolymer-containing layers, which in the latter case are commonly called midcoat and topcoat, each having a particular composition designed to produce particular performance and/or appearance effects.

In any event, the effect of the co-grinding to produce the more intimate mixture of binder at least with the pigment improves the adhesion of the layer to the substrate resulting from baking the composition applied to the substrate to fuse the layer to itself and the substrate. This improvement is obtained in comparison with applying the same composition to the same substrate by the composition having been made by milling the pigment and film hardener, if present, separate from the binder solution and merely blending the resultant dispersion and binder solution together.

The composition can also contain adhesion promoter such as colloidal silica and/or phosphate compound, such as metal phosphate, examples of which are Zn, Mn, or Fe phosphate.

The temperature of baking will depend on the particular fluoropolymer present and the time of baking. For PTFE as the fluoropolymer component, a baking temperature of 800° F. (427° C.) which rises to 825° F. (440° C.) in five minutes is preferred. For melt fabricable fluoropolymer, a baking temperature of 780° F. (415° C.) which rises to 800° F. (427° C.) in three minutes is preferred. The thickness of the layer from the composition made using co-grinding will generally be from 5 to 20 micrometers, and overcoat layer(s) will generally be from 10 to 20 micrometers.

The improvement described above with respect to aqueous dispersion compositions, in which the co-ground aqueous dispersion is added to the fluoropolymer aqueous dispersion can be obtained when an organic liquid is used as the coating medium in place of water. Coil coating of metal strip with fluoropolymer primer is presently done using an organic solvent carrier for the fluoropolymer, which is present in the carrier as particles, notably PTFE micropowder. In accordance with this embodiment of the present invention, the fluoropolymer, pigment, polymer binder, and film hardener are all co-ground together with surfactant to form a dispersion of the solid ingredients in the organic solvent medium and to obtain the improved adhesion described above. Adhesion promoter can also be included in this co-grinding step. In this embodiment, when an fluoropolymer containing overcoat is used in aqueous dispersion form, the organic-solvent composition formed layer is dried so that all water-incompatible solvent is removed prior to applying the overcoat, otherwise successive coats can be applied when the preceding layer is preferably dried to the touch.

By way of example, the following composition was prepared as an aqueous dispersion in accordance with the present invention:

|  | Weight Percent |
|---|---|
| black pigment | 2.025 |
| ultramarine blue pigment | 1.408 |
| Ludox ® colloidal silica | 0.909 |
| PTFE (solids in aqueous disp.) | 4.170 |
| polyamic acid | 4.195 |
| aluminum silicate | 3.323 |
| ferric phosphate | 0.820 |
| Tamol ® SN surfactant | 0.284 |
| dionized water | 72.344 |
| triethanolamine | 0.069 |
| Triton ® X-100 surfactant | 0.713 |
| diethylethyl alcohol amine | 0.592 |
| triethyl amine | 1.184 |
| furfuryl alcohol | 3.587 |
| N-methylpyrrolidone | 4.330 |

The aqueous dispersion was made by preparing a solution of the polyamic acid salt in n-methyl pyrrolidone/furfiryl alcohol by reacting polyamic acid salt with triethyl amine in this medium in accordance with U.S. Pat. No. 4,014,834, co-grinding this binder-containing medium with the pigment, aluminum silicate, and the Tamol® SN surfactant contained in water, using a Netzch® mill under the following conditions: 80% load of glass balls, pump rate of 90 rpm, agitator shaft speed 840 rpm, and dispersion throughput of 30 gal/hr (0.0038 m$^3$/hr). The resultant aqueous dispersion was then blended with the aqueous dispersion of PTFE and the remaining ingredients and the colloidal silica until uniformly dispersed in a mixing tank having an agitator blade operating at 70 rpm.

The resultant finish composition was sprayed onto a smooth, clean glass surface (fry pan) to form a wet primer layer. A midcoat and topcoat were also sprayed onto the primer layer after such layer had been dried to touch. The midcoat had the composition which was essentially the same as set forth in Table 2 of U.S. Pat. No. 5,240.775, except that the 40.704 wt% of PTFE was a blend of 85 wt% PTFE with 15 wt% PFA. The topcoat composition was essentially the same as the topcoat composition set forth in the Table bridging cols. 2 and 3 of U.S. Pat. No. 5250,356, except that the 71.5 wt% PTFE was a blend of 95 wt% PTFE and 5 wt% PFA.

The coated substrate was baked at a temperature of 800° F. (427° C.) rising to 825° F. (440° C.) for 5 minutes.

The durability (adhesion and scratch resistance) resulting from the practice of the present invention is shown by the "tiger paw" abuse test wherein the coated substrate (fry pan) is continuously scratched with multiple ball point pen tips (3) which are held by a weighted holder (400g) which rotates the pen tips against and around the coated fry pan surface. To accelerate the failure of the entire thickness of the coating, i.e. the rotation of the pen tips produces a continuous annular path penetrating the entire thickness of the coating to reach the substrate, the fry pan is heated at 205° C. during this scratch test, and the time to failure is recorded. The longer the time to failure, the better the durability of the non-stick coating. The time to failure using co-grinding to make the primer layer ranged from 90 to 135 minutes for a wide variety of substrates (aluminum, cold rolled steel, cast iron, enamel, glass, and lightly etched pyroceram), while when separate milling was used, the time to failure was 45 to 60 minutes and less. Separate milling means that the pigment and film hardener were milled separately, and binder solution was not present in either grinding medium, followed by blending the aqueous fluoropolymer dispersion with the aqueous dispersions of pigment and film hardener, and binder solution, including the remaining ingredients to form the finish composition.

What is claimed is:

1. Process for preparing an aqueous fluoropolymer coating composition for application to a substrate and baking to cause the composition to fuse into a layer adhering to the substrate, comprising intimately mixing of aqueous dispersion of pigment with aqueous solution of polymer binder by co-grinding said dispersion and solution together and mixing the resultant co-ground dispersion and aqueous dispersion of fluoropolymer one with the other to form said composition.

2. The process of claim 1 and in addition, applying said composition to said substrate and baking said composition to form said layer on said substrate.

3. The process of claim 2 wherein said substrate is cookware or bakeware.

4. The process of claim 1 and in addition, adding inorganic film hardener to the co-grinding step.

5. The process of claim 4 wherein the film hardener is silicate compound.

6. The process of claim 1 wherein the polymer binder is polyamic acid salt.

7. The process of claim 2 and applying an overcoat of fluoropolymer composition to said layer on said substrate, and wherein the composition forming said layer and said overcoat composition are baked simultaneously.

8. The process of claim 7 wherein said overcoat composition comprises a midcoat layer and a topcoat layer.

9. The composite structure obtained by the process of claim 2.

10. Process for preparing an organic solvent based fluoropolymer composition for application to a substrate and baking to fuse the composition to a layer which adheres to said substrate, comprising co-grinding said fluoropolymer with pigment, inorganic filler film hardener, and polymer binder in said organic solvent to obtain said composition as an intimate mixture.

11. Process of claim 10 wherein said polymer binder is soluble in said solvent.

12. Process of claim 10 and in addition applying said composition to said substrate and baking said composition to form said layer.

13. Process of claim 12 wherein said substrate is a metal coil.

14. Process of claim 10 wherein said composition is in dispersion form.

15. Process of claim 14 wherein said polymer binder is dissolved in said organic solvent.

* * * * *